(12) United States Patent
Deckard

(10) Patent No.: US 6,196,707 B1
(45) Date of Patent: Mar. 6, 2001

(54) PRESSURE ACTIVATED FLASHING BICYCLE PEDAL

(76) Inventor: William Deckard, 1175 Temperance La., Richboro, PA (US) 18954

( * ) Notice: Subject to any disclaimer, the term of this patent is extended or adjusted under 35 U.S.C. 154(b) by 0 days.

(21) Appl. No.: 09/329,410

(22) Filed: Jun. 10, 1999

(51) Int. Cl.⁷ ....................................................... B62J 6/16
(52) U.S. Cl. ......................... 362/473; 362/234; 362/235; 362/545
(58) Field of Search ................................... 362/473, 545, 362/234, 245, 251, 276, 802; 340/432

(56) References Cited

U.S. PATENT DOCUMENTS

| | | | |
|---|---|---|---|
| 2,185,600 | 1/1940 | McComb | 362/473 |
| 2,334,442 | 11/1943 | Salimbene | 362/473 |
| 2,493,491 | 1/1950 | MacMahon | 362/184 |
| 2,732,540 | 1/1956 | MacMahon | 340/432 |
| 2,767,391 | 10/1956 | MacMahon | 340/432 |
| 3,764,976 | 10/1973 | MacMahon | 340/432 |
| 5,015,918 | * 5/1991 | Copeland | 362/473 |
| 5,029,055 | * 7/1991 | Lindh | 362/473 |
| 5,702,172 | 12/1997 | Kilburn | 362/473 |
| 6,016,101 | * 1/2000 | Brown | 340/432 |

* cited by examiner

*Primary Examiner*—Alan Cariaso
(74) *Attorney, Agent, or Firm*—LaMorte & Associates

(57) ABSTRACT

An improved pedal assembly for bicycles. The pedal assembly includes a pedal casing. The pedal casing has a top surface, a bottom surface and at least one side edge surface. A plurality of LEDs are disposed within the pedal casing wherein light from said LEDs is viewable through the side edge surfaces of the casing. At least one battery receptacle is also disposed within the pedal casing. A first activator is disposed in the pedal casing below the top surface, wherein the first activator is triggered when a predetermined force is applied to the top surface. Similarly, a second activator is disposed in the pedal casing below the bottom surface, wherein the second switch is triggered when a predetermined force is applied to the bottom surface. The first activator and the second activator are electrically interconnected to both the battery receptacle and the LEDs so that the LEDs are electrically connected to the battery receptacle when either the first activator or the second activator are triggered.

18 Claims, 3 Drawing Sheets

PRESSURE ACTIVATED FLASHING BICYCLE PEDAL

BACKGROUND OF THE INVENTION

1. Field of the Invention

In general, the present invention relates to bicycle pedals that contain internal lights. More particularly, the present invention is related to bicycle pedals that contain flashing lights for improved visibility of the bicycle by motorists.

2. Description of the Prior Art

Because a child on a bicycle is small, fast and typically does not obey the rules of the road, such a child is difficult to see by a driver of a motor vehicle. This is especially true in twilight or at night when lighting is poor. To help increase the visibility of bicycles, many bicycles are now sold with reflectors. The reflectors are typically located on the wheels of the bicycle and on the pedals of the bicycle.

In order for a reflector to be visible, it must reflect light. Accordingly, bicycle reflectors are most effective when a bicycle is located in front of the headlights of an automobile and there is a bright light to reflect. However, such bicycle reflectors are not nearly as noticeable if the bicycle is located to the side of the automobile and out of the direct line of the beams of the headlights.

To help improve the visibility of bicycles, bicycles have been built with safety lights. Safety lights are self illuminating. Accordingly, safety lights do not rely upon the reflection of headlights and the safety lights can be seen at any angle of approach to the bicycle. In the prior art record, there are many different types of safety lights for bicycles. Safety light assemblies have been designed for the seat, handle bars, and wheels of bicycles. Another popular place to place safety lights for a bicycle is in or on the pedals of the bicycle. Since the pedals of a bicycle move as the bicycle is ridden, the lights in the pedals also move, thereby becoming even more noticeable to passing motorists. Therefore, by placing lights in the pedals of the bicycle, the light becomes a more effective safety device.

The original pedal assemblies that contained safety lights used batteries and incandescent bulbs. Such prior art pedal devices are exemplified by U.S. Pat. No. 2,732,540 to MacMahon, entitled, Bicycle Lights. The problem with such lights is that the incandescent bulbs require a good amount of power. Accordingly, the batteries did not last very long.

To address the problems of battery life, pedal assemblies were designed with internal power generators so that batteries would not have to be used. Such prior art patents are exemplified by U.S. Pat. No. 2,767,391 to MacMahon, entitled, Signaling Devices. A problem associated with self generating illuminated pedals is that the lights go dark when a person coasts on the bicycle.

As technology improved, the problems of short battery life and self power generating pedal assemblies were solved by the development of bright, low power light emitting diodes (LEDs). By placing LEDs in a pedal, even a small battery could keep the LEDs lit for dozens of hours. To further improve the effectiveness of the LEDs being viewed by motorists, the LEDs were designed to flash when in operation. The flashing LEDs are more noticeable than steadily lit LEDs. Such prior art pedal assemblies are exemplified by U.S. Pat. No. 3,764,976 to MacMahon, entitled Pedal Mounted Signal Light, and U.S. Pat. No. 5,702,172 to Kilburn, entitled Light Emitting Bicycle Pedal.

Although LEDs use less power than do incandescent bulbs, LEDs still consume electrical power. Additionally, in general, the brighter the LED is, the more electrical power that LED consumes. In prior art pedal assemblies that use batteries and LEDs, the LEDs do not constantly flash. Rather, the pedal assemblies come with on/off switches so that the LEDs can be selectively activated. In this manner, the LEDs do not run the battery down when the bicycle is being stored in the garage or is otherwise not being ridden.

Children often forget to turn things on and off. Accordingly, a child often forgets to turn on the lights of their pedal assemblies when they ride their bicycles. similarly, even if a child were to turn the pedal lights on, that child may forget to turn the pedal lights off when they leave the bicycle. Accordingly, the LEDs may flash in a storage shed until the batteries become dead. In either case, the illuminated pedal assemblies fail to work and provide the safety at night that is intended.

A need therefore exists in the art for a pedal assembly that contains batteries and LEDs to illuminate the pedal assembly, however the lights automatically activate when the bicycle is in use and deactivate when the bicycle is not in use. This need is met by the present invention as described and claimed below.

SUMMARY OF THE INVENTION

The present invention is an improved pedal assembly for bicycles. The pedal assembly includes a pedal casing. The pedal casing has a top surface, a bottom surface and at least one side edge surface that extends between the top surface and the bottom surface of the pedal. When the pedal is in use, a person's foot rests upon either the top surface or the bottom surface of the pedal. A plurality of LEDs are disposed within the pedal casing wherein light from said LEDs is viewable through the side edge surfaces of the casing. At least one battery receptacle is also disposed within the pedal casing.

A first activator is disposed in the pedal casing below the top surface, wherein the activator is triggered when a predetermined force is applied to the top surface. Similarly, a second activator is disposed in the pedal casing below the bottom surface, wherein the second switch is triggered when a predetermined force is applied to the bottom surface. The first and second activators can be electrical contacts, switches or pressure sensors. The first and second activators are electrically interconnected to control circuit. When either the first or second activator is triggered, the control circuit activates the LEDs.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Figure 1:
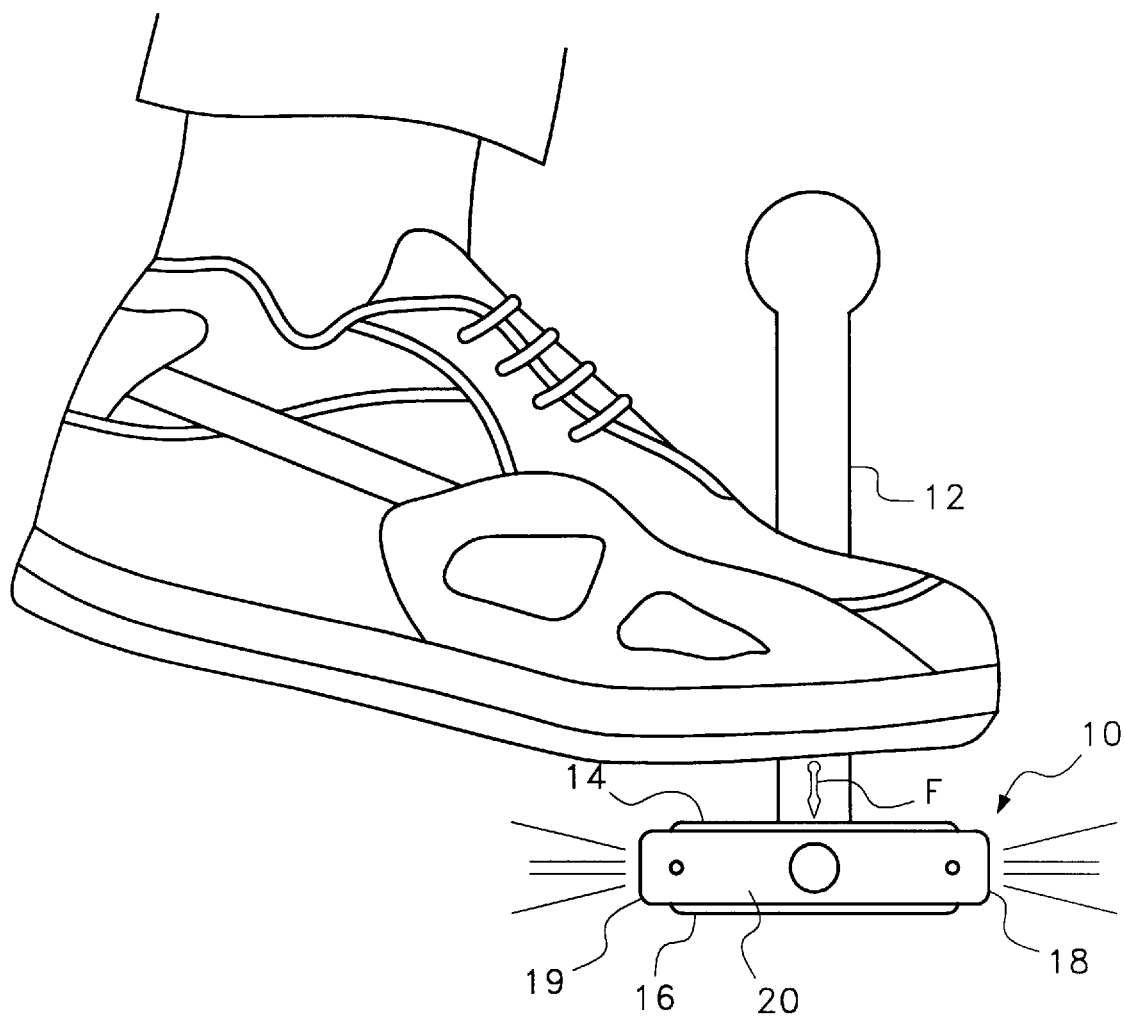
FIG. 1 is front view of an exemplary embodiment of the present invention pedal assembly shown in use on a bicycle.

Referring to FIG. 1, an embodiment of the present invention pedal assembly 10 is shown. The pedal assembly 10 is shown assembled onto the pedal lever 12 of a bicycle. The pedal assembly 10 has two generally planar contact surfaces 14, 16 upon which a person's foot rests when pedaling the bicycle. The two planar contact surfaces 14, 16 are parallel and alternate in position as the pedal assembly 10 is rotated. The pedal assembly 10 also has two long edge surfaces 18, 19 that extend between the planar contact surfaces 14, 16. When pedaling the bicycle, one of the long side edge surfaces 18 faces forward on the bicycle and one long side edge surface 19 faces rearward. These long side edge surfaces can also alternate in position as the pedal assembly 10 is rotated.

The pedal assembly also contains a front edge surface 20 which faces away from the bicycle and a back edge surface (not shown) which faces toward the bicycle.

In the embodiment shown, the pedal assembly 10 contains light emitting diodes (LEDs) that are powered by batteries within the casing of the pedal assembly 10. The LEDs are oriented so that light from the LEDs is visible along either long side edge surface 18, 19 of the pedal assembly 10 and along the front edge surface 20 of the pedal assembly 10.

As will be explained, the LEDs are controlled by activators that are located in the center of either of the planar contact surfaces 14, 16. The activators are triggered when either of the planar contact surfaces 14, 16 experience a contact force F in excess of a predetermined threshold. In the preferred embodiment, the threshold of the contact force F need only be a few ounces. According, even if a small child were to place his/her foot onto the pedal assembly 10, the LEDs would begin to blink.

Typically, the only time a weight is applied to the planar contact surfaces 14, 16 of a pedal assembly 10 is when a person is sitting on the bicycle and has his/her foot resting on the pedal assembly 10. When the bicycle is at rest with no rider, typically nothing contacts the planar contact surfaces 14, 16 of the bicycle pedals. Accordingly, the LEDs contained within the pedal assembly 10 will only light when the bicycle has a rider on it and that rider's feet are on the pedals of that bicycle. If the bicycle has no rider the LEDs will not be lit. As a result, the LEDs will automatically activate when a rider uses the bicycle and will automatically deactivate when a rider leaves the bicycle. A child therefore need not remember to turn on or off any manual activation switch.

Furthermore, the LEDs will light when a person's foot is on the planar contact surface 14, 16 of the pedal assembly 10 regardless of whether or not the bicycle is being actively pedaled. The LEDs are therefore visible to a passing motorist even if a child is coasting down a hill.

Figure 2:
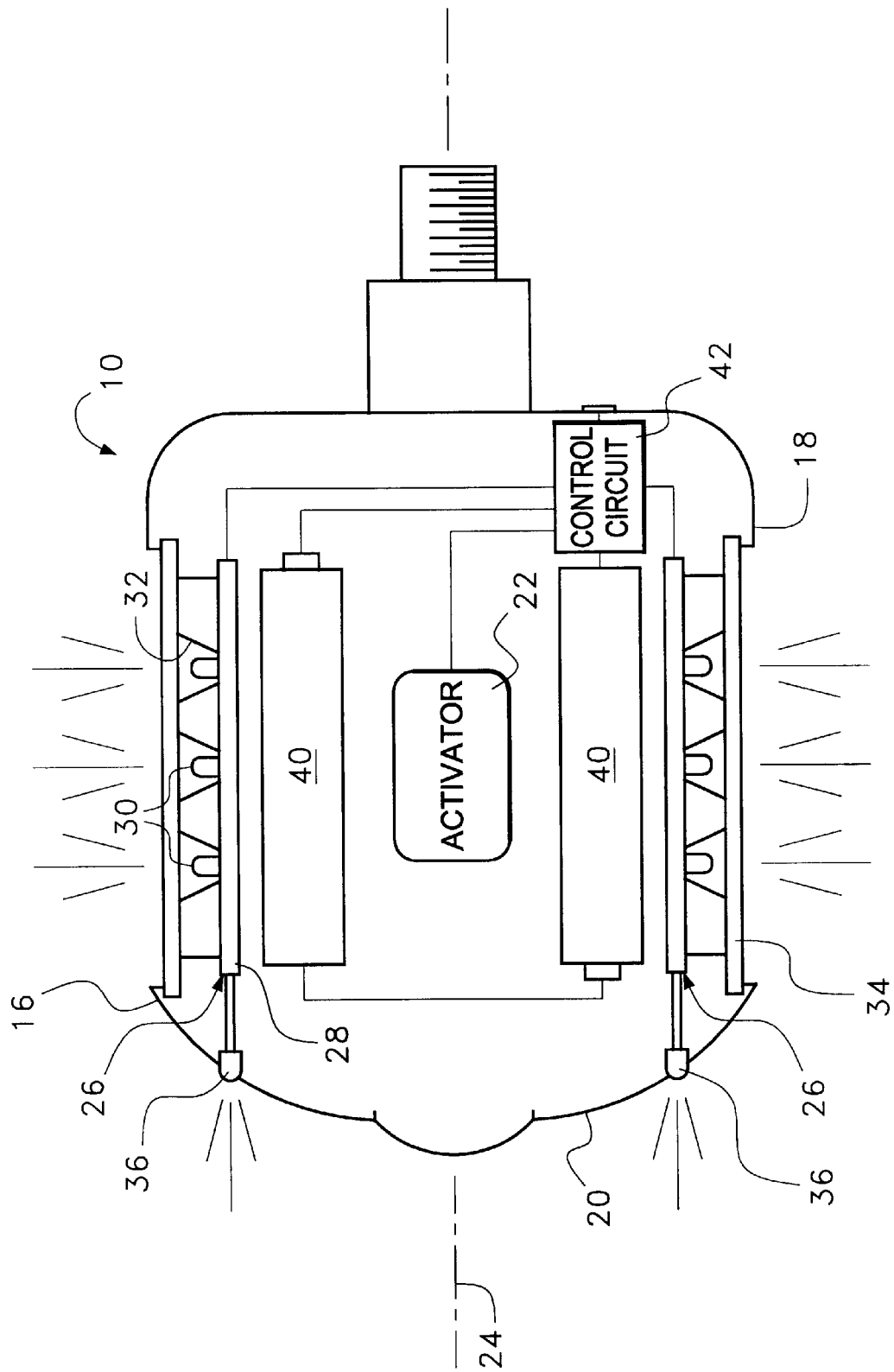
FIG. 2 is a schematic view of an exemplary embodiment of the present invention pedal assembly.

Referring to FIG. 2, the shown schematic shows an activator 22 located in the center of pedal assembly 10 directly below either planar contact surface 14, 16 (FIG. 1). The use of a single activator 22 on either side of the pedal assembly 10 is merely exemplary and it should be understood that any plurality of activators at different points on the faces of the pedal can be used. The activators can be any device capable of detecting a contact force on the planar contact surfaces 14, 16 of the pedal assembly 10. The activators, therefore can be electrical contacts, mechanical switches, pressure sensors or any known type of proximity sensor.

The pedal assembly 10 embodies a central axis 24 around which the pedal assembly 10 spins when attached to the bicycle. The pedal assembly 10 is preferably symmetrically designed around the central axis 24 so that the pedal assembly 10 remains generally balanced around that central axis 24.

LED subassemblies 26 are positioned on either side of the pedal assembly 10 proximate each long side edge surface 18, 19. Each LED subassembly 26 contains a circuit board substrate 28 upon which are mounted a plurality of LEDs 30. Each of the LEDs 30 passes into a reflective pocket 32 that helps to direct the light emitted by the LEDs 30 out and away from the pedal assembly 10. A protective lens cover 34 covers the LEDs 30 and the reflective pockets 32. The protective lens cover 34 can be colored plastic, white plastic or clear plastic, wherein the protective lens cover 34 prevents direct external contact of the LEDs 30. The protective lens cover 34 can therefore provide color to the light being emitted by the LEDs 30. For example, if the LEDs 30 produce white light and the protective lens covers 34 are red plastic, the light from the LEDs 30 will be perceived as red.

The areas of the protective lens covers 34 not directly above the LEDs 30 preferably are manufactured to have reflective properties. As such, should the LEDs 30 ever fail to light, the protective lens covers 34 still perform as traditional pedal reflectors.

Long stem auxiliary LEDs 36 also extend from the edge of the circuit board substrate 28 toward the forward edge surface 20 of the pedal assembly. The long stem auxiliary LEDs 36 enter apertures in the pedal assembly casing that enable the long stem LEDs 36 to be visible from the front edge surface 20 of the pedal assembly 10. Accordingly, when all of the LEDs 30, 36 in the pedal assembly 10 are lit, light from the LEDs 36 is emitted from the front edge surface 20 of the pedal assembly 10 as well as from the long side edge surfaces 18, 19 of the pedal assembly 10.

The various LEDs 30, 36 are powered by batteries 40 which are retained within the pedal assembly 10. The batteries 40 rest in battery receptacles that are manufactured into the structure of the pedal assembly 10. The batteries 40 can be disposable alkaline batteries or rechargeable batteries, such as nickel-cadmium batteries. The flow of electricity between the batteries 40 and the various LEDs 30, 36 is controlled via a control circuit 42 and is triggered by the activators 22. As has been previously explained, when no pressure is applied to the planar contact surfaces 14, 16 of the pedal assembly 10, the activators 22 are neutral and the control circuit prevents the flow of electricity between the batteries 40 and the LEDs 30, 36. However, when a person's foot is on the pedal assembly 10, the activators 22 are triggered and the control circuit 42 interconnects the batteries 40 to the various LEDs 30, 36.

The control circuit 42 can have many different configurations. However, in a preferred embodiment, the control circuit 42 embodies an oscillating circuit that causes the LEDs 30, 36 to flash at a predetermined rate. As a result, when a child places his/her foot onto the pedal assembly 10, the various LEDs 30, 36 will begin to flash. The LEDs 30, 36 will continue to flash until that child takes his/her foot off of the pedal assembly 10.

Figure 3:
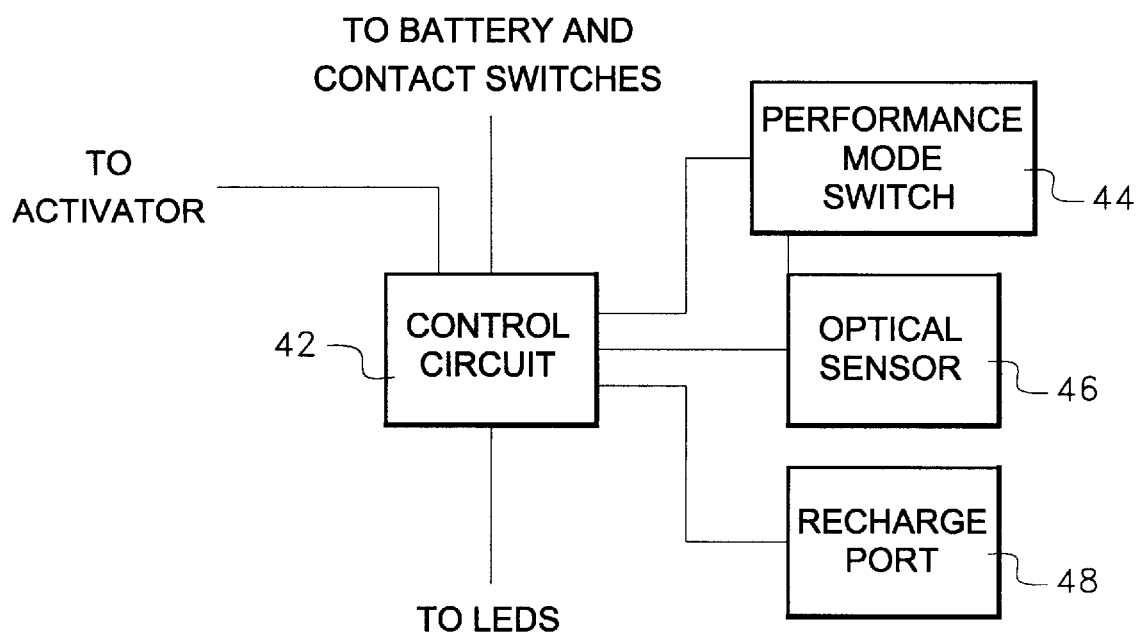
FIG. 3 is a schematic view of an alternate embodiment of a control circuit in accordance with the present invention.

Referring to FIG. 3, a schematic of a modified embodiment of the control circuit 42 is shown. As has been previously described, the control circuit 42 within the pedal assembly controls the flow of electricity between the batteries and the various LEDs. However, as is shown in FIG. 3, an optional performance mode switch 44 can be connected to the control circuit 42. The performance mode switch 44 will enable the control circuit 42 to be manually set into two separate performance modes. In the first performance mode, the control circuit 42 will only flash the LEDs when a predetermined contact force is experienced by one of the contact surfaces of the pedal. In the second performance mode, the control circuit can cause the LEDs to flash continuously regardless of any pedal contact.

Also shown in FIG. 3, is an optional light sensor 46. The light sensor 46 can be used to activate the control circuit 42 depending upon ambient light. When the level of ambient light surrounding the pedal assembly falls below a predetermined threshold, the light sensor 46 activates the control circuit 42 and the LEDs will blink when the bicycle is in use. However, if the light sensor 46 detects bright light conditions, the light sensor 46 will not activate the control circuit 42 and the LEDs will not blink. This will prevent the LEDs from flashing during bright daylight conditions where the light from the LEDs cannot be readily seen.

Also in FIG. 3, is a recharging port 48. The recharging port can be used to attach a recharging device to the pedal assembly if the pedal assembly contains rechargeable batteries.

It should be understood that the specifics of the present invention described above illustrates only exemplary embodiments of the present invention. A person skilled in the art can therefore make numerous alterations and modifications to the shown embodiments utilizing functionally equivalent components to those shown and described. All such modifications are intended to be included within the scope of the present invention as defined by the appended claims.

What is claimed is:

1. A pedal assembly for a bicycle, comprising:
   a pedal casing having a top surface, a bottom surface and at least one side edge surface that extends between said top surface and said bottom surface;
   a plurality of LEDs disposed within said pedal casing wherein light from said LEDs is viewable through said at least one side edge surface;
   at least one battery receptacle disposed within said pedal casing, wherein said at least one battery receptacle is configured to receive a battery therein;
   a first activator disposed in said pedal casing proximate said top surface, wherein said first activator is triggered when a predetermined force is applied to said top surface;
   a second activator disposed in said pedal casing proximate said bottom surface, wherein said second activator is triggered when a predetermined force is applied to said bottom surface;
   wherein said plurality of LEDs are electrically interconnected with said at least one battery receptacle when either said first activator or said second activators are triggered.

2. The assembly according to claim 1, further including a control circuit disposed between said at least one battery receptacle and said plurality of LEDs for flashing said LEDs when said first activator or said second activator are activated.

3. The assembly according to claim 2, further including a performance mode switch coupled to said control circuit for causing said plurality to continuously blink.

4. The assembly according to claim 2, further including a light sensor coupled to said control circuit for enabling said control circuit when ambient light fall below a predetermined threshold and disabling said control circuit when ambient light rises above said predetermined threshold.

5. The assembly according to claim 1, further including a protective lens cover disposed over at least some of said plurality of LEDs, whereby light emanating from those LEDs passes through said protective lens cover.

6. The assembly according to claim 5, wherein said protective lens cover is colored.

7. The assembly according to claim 6, wherein said protective lens cover contains areas that are configured as light reflectors.

8. A bicycle pedal, comprising:
   two generally parallel contact surfaces, wherein a person's foot rest on one of said contact surfaces when pedalling;
   a plurality of lights disposed in said pedal, wherein light from said lights is visible from points external to said pedal;
   a power source contained within said pedal;
   activators disposed below each of said contact surfaces that detect the presence of an object in contact with said contact surfaces, wherein said activators cause an interconnection between said power source to said plurality of lights when one of said activators detects an object in contact with one of said contact surfaces, thereby causing said plurality of lights to light.

9. The pedal according to claim 8, wherein said plurality of lights are light emitting diodes.

10. The pedal according to claim 8, wherein said activators are selected from a group consisting of electrical contacts, electrical switches and sensors.

11. The pedal according to claim 8, further including a control circuit disposed between said power source and said plurality of lights for flashing said lights when one of said activators detects an object in contact with one of said contact surfaces.

12. The pedal according to claim 11, further including a performance mode switch coupled to said control circuit for manually causing said lights to continuously light.

13. The pedal according to claim 11, further including a light sensor coupled to said control circuit for enabling said control circuit when ambient light falls below a predetermined threshold and disabling said control circuit when ambient light rises above said predetermined threshold.

14. The pedal according to claim 8, further including a protective lens cover disposed over at least some of said plurality of lights, whereby light emanating from those lights passes through said protective lens cover.

15. The pedal according to claim 14, wherein said protective lens cover is colored.

16. The pedal according to claim 15, wherein said protective lens cover contains areas that are configured as light reflectors.

17. A method of illuminating a bicycle pedal of the type having two opposite flat surfaces upon which a foot may rest, said method comprising the steps of:
   providing lights within said pedal;
   providing a power source within said pedal;
   positioning at least one pressure sensitive activator in said pedal on each of the opposite flat surfaces of said pedal, so that at least one pressure sensitive activator is triggered when a person places his/her foot on either of the opposite flat surfaces of said pedal, wherein the triggering of said at least one pressure sensitive activator interconnects said lights to said power source and cause said lights to light.

18. The method according to claim 17, further including the step of causing said lights to flash at a predetermined flash rate when a person's foot triggers one of said pressure sensitive activators.

\* \* \* \* \*